Sept. 12, 1944.  A. E. SCHUBERT  2,358,106
PHOTOGRAPHIC PROJECTION ENLARGER
Filed July 4, 1942  2 Sheets-Sheet 1
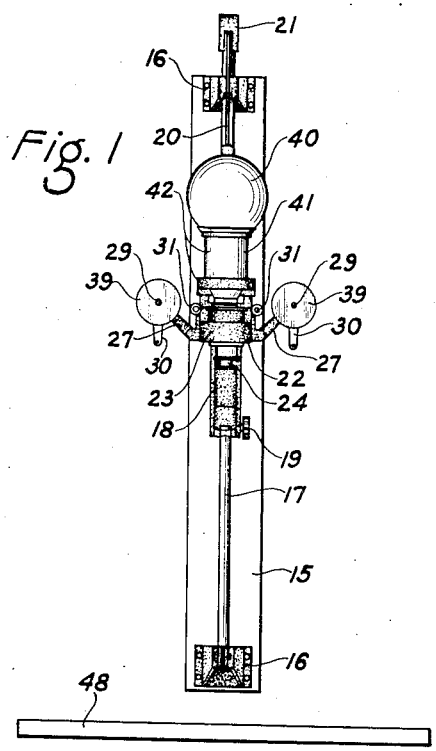
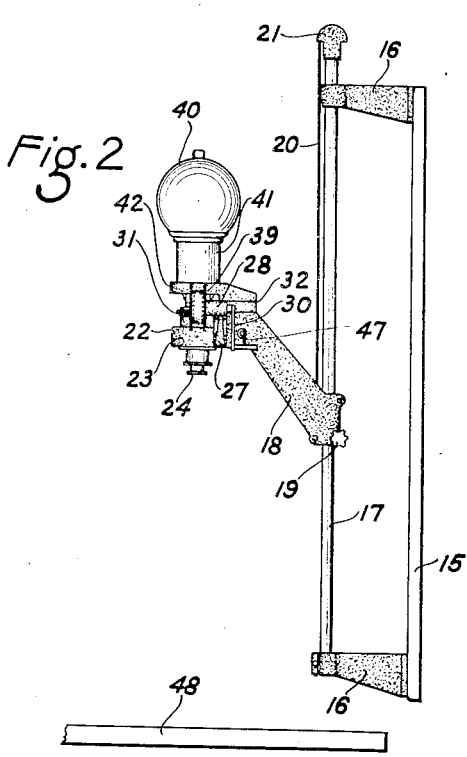
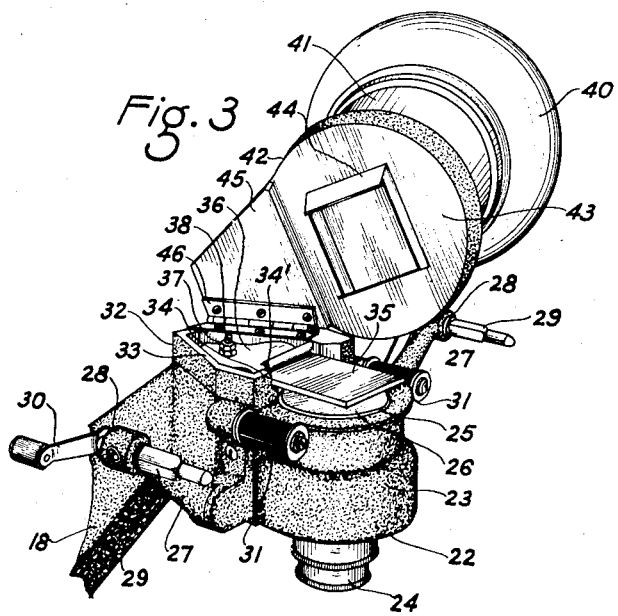
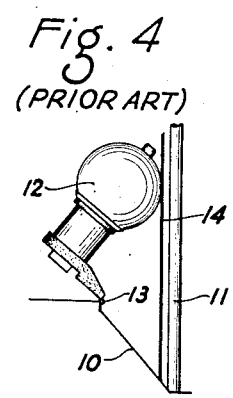
Alvin E. Schubert
INVENTOR
BY
ATTORNEYS

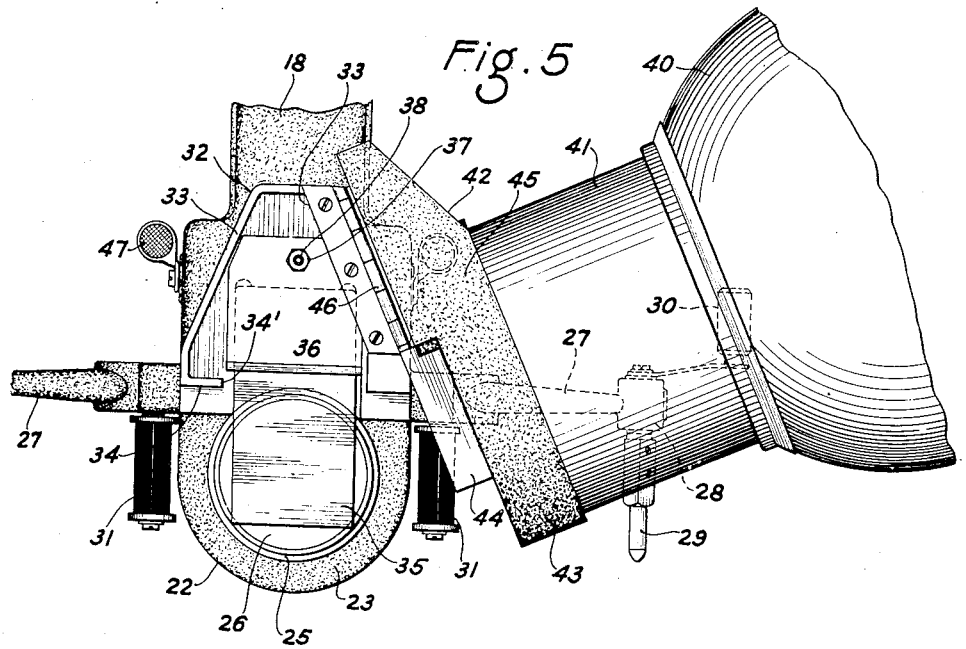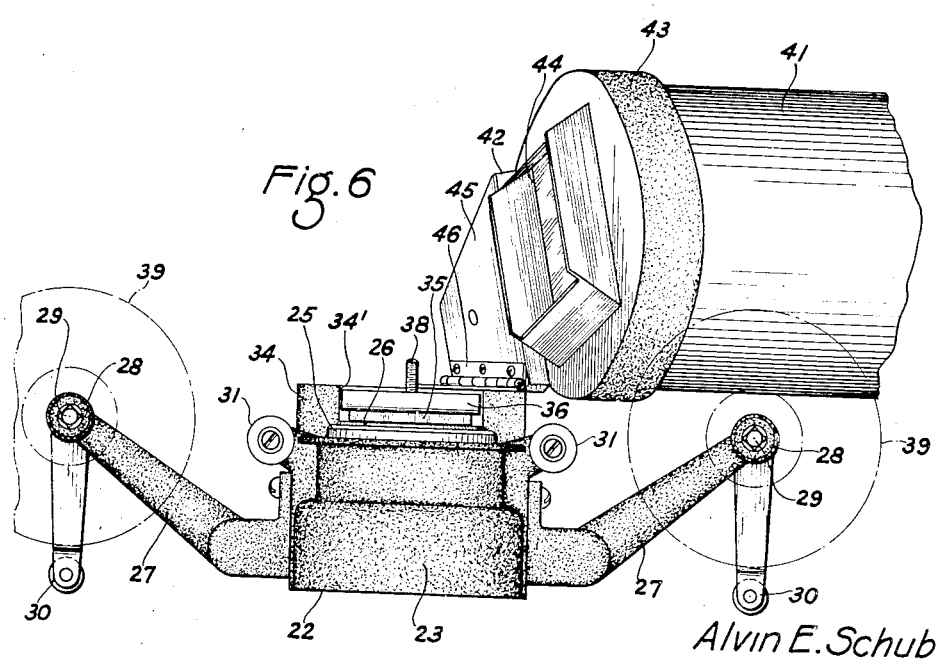

Patented Sept. 12, 1944

2,358,106

UNITED STATES PATENT OFFICE 2,358,106

PHOTOGRAPHIC PROJECTION ENLARGER

Alvin E. Schubert, Rochester, N. Y., assignor to Eastman Kodak Company, Rochester, N. Y., a corporation of New Jersey Application July 4, 1942, Serial No. 449,755

4 Claims. (Cl. 88—24)

The present invention relates to a photographic projection enlarger and more particularly to a projection enlarger for making enlargements from reduced images on a film strip.

One of the greatest difficulties encountered in making enlargements from miniature films is to keep the film negative or transparency free from dust or dirt. So far, the best remedy for such difficulty is constant cleaning of the film and of the film gate in the enlarger or similar apparatus.

The primary object of the present invention is the provision of a photographic projection enlarger in which the film gate is readily accessible for cleaning.

A further object of the invention is the provision of a hinged lamp house operatively connected to the enlarger base so that it may be swung to an open position without interfering with the enlarger support or with the film reels thereof.

Another object is the provision of an enlarger mounted upon a vertical support member, adapted to carry a pair of film reels, and having a lamp house hinged for opening movement so that the vertical support member and/or film reel will not block opening movement of the lamp house and will permit such opening thereof so that the film gate is readily accessible.

Other and further objects of the invention will be suggested to those skilled in the art by the description which follows.

The above and other objects of the invention are embodied in a photographic enlarger mounted upon a vertical support member and including a base having a film gate and a lamp house operatively connected to said base and capable of movement to provide ready and complete access to said film gate.

Reference is hereby made to the accompanying drawings wherein similar reference characters designate similar elements and wherein:

Figs. 1 and 2 are, respectively, a front elevation and a side elevation of a photographic projection enlarger mounted upon a vertical support and for projecting onto a horizontal copy board.

Fig. 3 is a perspective view of a photographic enlarger according to the invention showing the lamp house in open position.

Fig. 4 is a diagrammatic side elevation of a hinged lamp house according to the prior art.

Figs. 5 and 6 are, respectively, a fragmentary plan view and front view of the photographic enlarger of the invention with the lamp house in open position.

The advantages of the oblique hinged connection for an enlarger lamp house may be better understood by reference to Fig. 4 which shows an enlarger base 10 mounted upon a vertical rod 11 and a lamp house assembly 12 connected to base 10 by a hinge 13 which has its axis at right angles to the vertical rod 11. Obviously, the opening of such a lamp house assembly is extremely limited because the top of the lamp house strikes the vertical rod 11 or counter-balance tape 14 thereon. Spacing the lamp house assembly 12 from the vertical support a distance sufficient to permit full opening movement would render the base or bracket for the enlarger too big and hinging the lamp house for movement to the side would bring it directly over the film reel which would limit the opening movement of the lamp house.

In the illustrated embodiment, the photographic enlarger is mounted upon a base 15 which is vertically supported upon a wall or other vertical structure and which carries a pair of brackets 16 in which a vertical support member or rod 17 is mounted.

The projector assembly comprises generally a base assembly and a lamp house assembly and is adapted to project an image onto a copy board 48.

The base assembly includes a support arm 18 having one end in sliding engagement with the vertical support 17 and having a thumb nut 19 for clamping the support arm 18 to the vertical rod 17. A flexible tape 20, preferably of steel, is attached at one end to said support arm 18 and extends through the head 21 and over a pulley therein and has its other end connected to a counter weight, not shown, within the vertical support rod 17. Such counter balancing arrangement of a projector assembly is well known and consequently need not be described in detail.

A base 22 is on the upper end of support arm 18 and comprises a circular portion 23 to which the objective lens 24 is attached and within which a movable gate member 25 including a glass flat 26 is mounted.

A pair of reel arms 27 are attached to opposite sides of base 22 and each has a bearing 28 on its end. Reel spindles 29 are rotatably mounted in said bearings 28 and each carries a crank handle 30. A pair of guide rollers 31 are rotatably mounted on base 22 on each side of the circular portion 23 and in position to engage a film strip extending over the glass flat 26.

The base 22 also includes a triangularly-shaped housing 32 at one side of the projection opening in circular portion 23 and includes an inclined portion or wall 33 and a front wall 34 which is provided with a recess 34'. The stationary gate member comprises an optical flat 35, preferably of glass, and extending through recess 34' into housing 32. The projecting end of flat 35 is directly above the glass flat 26 of movable gate member 25. A clamping means within housing 32 holds optical flat 35 in place and may comprise a clamp member 36 and nuts 37 on bolt 38 for pressing clamp member 36 against optical flat 35 which is in turn pressed against the bottom of the housing 32. Removal of optical flat 35 by releasing the clamping means facilitates the cleaning of said flat 35 and also of the glass flat 26 of the movable gate member 25.

Flanged reels 39 may be detachably mounted upon the spindles 29 and may in a known manner carry coils of film with an intermediate portion extending over guide rollers 31 and between glass flat 26 and optical flat 35 which comprise the film gate of the enlarger.

A pair of finger members 47 are pivotally mounted on both sides of the base 22 and are operatively connected by a linkage, not shown, to the movable gate member 25 so that the same may be retracted from the optical flat 35 for movement of the film through the gate without abrasion.

The lamp house assembly comprises a spherical lamp chamber 40 including a light source, not shown, a condenser barrel 41 and a base member 42. Said base member 42 includes a circular portion 43 within which the condenser barrel 41 is mounted and carries on its other face a condenser mask 44. Said base member 42 also includes a lateral projection 45 which is similar in outline to the outline of the triangular housing 32.

An operative connection is provided between the base and lamp house assemblies and is angularly arranged so that upon opening movement of the lamp house assembly it will be displaced with respect to both the vertical plane through the gate and vertical support member and the vertical plane which is perpendicular to the film or transparency plane and at right angle to the first-mentioned vertical plane. Such an operative connection may comprise a hinge 46 having one side attached to the wall 33 of housing 32 and having its other side connected along the edge of the lateral projection 45 of the lamp house assembly base member 42. The pivotal axis of such hinge 46 is at an angle both to a vertical plane through the vertical support rod 17 and through the center of the film gate and also at an angle to a vertical plane perpendicular to the film plane and passing through the centers of the reels and parallel to the planes of rotation of the film reels. In order that the lamp house assembly will be displaced more with respect to the support rod 17 than with respect to the film reels 39, the axis of said hinge 46 makes a smaller angle with the vertical plane through the support than the angle said axis makes with the other vertical plane through the film.

It will now be apparent that the advantages of the photographic projection enlarger hereinbefore described are that the lamp house assembly may be tilted so as not to interfere with the vertical support or film reels and so that the lamp house assembly may be moved to render the film gate very accessible. At the same time the lateral projection 45 forming the cover for housing 32 is removed therefrom so that if necessary or desirable the clamping means for the stationary optical flat 35 may be released and said flat removed for cleaning it or for cleaning the glass flat 26 thereunder.

Since other modifications of the invention are possible, the present disclosure is to be construed in an illustrative sense and the scope of the invention is defined in the appended claims.

Having now particularly described my invention what I desire to secure by Letters Patent of the United States, and what I claim is:

1. A photographic enlarger comprising a vertical support member, a projecting assembly including a base mounted on said support member and a lamp house upon said base, a film gate member on said base and for supporting a film in a plane which is perpendicular to a vertical plane through said assembly and said support member, a pair of spindles on said base for supporting a pair of film rolls each on and adjacent to opposite sides of said lamp house, and a hinge connection between said base and said lamp house and having its axis angularly arranged to pass through said vertical plane and also a vertical plane perpendicular thereto and to the plane of said film, the angle that said axis makes with the vertical plane through said assembly and said support member being smaller than the angle said axis makes with the other vertical plane, whereby the path of opening movement of said lamp house is between said support and one of said film rolls but nearer to said one film roll.

2. A photographic enlarger comprising a vertical support member, a projecting assembly including a base mounted on said support member and a lamp house upon said base, film handling means on said base, for moving a film strip through a film gate in a direction perpendicular to a vertical plane through said assembly and said support, and including a pair of spindles located and adapted to support a pair of film rolls each on and adjacent to opposite sides of said lamp house, the axes of said spindles and film rolls being parallel to said vertical plane and to the film plane, and a single hinge means operatively connecting said lamp house to said base, having an axis angularly arranged to extend through said vertical plane and through a second vertical plane perpendicular thereto and to the axis of said film roll, and locating the path of opening movement for said lamp house between said support member and one of said film rolls so that said lamp house can be opened without interference from said support and/or said film rolls.

3. A photographic enlarger comprising a vertical support member, a projecting assembly including a base providing a film gate and having a portion spaced from said film gate and inclined to a vertical plane through said projecting assembly and said support member, a lamp house upon said base and including a laterally extending projection having an angular portion, and a hinge member having one part fastened to the inclined portion of said base and the other part fastened to the angular portion on the projection from said lamp house and with the hinge axis extending through said vertical plane and through a second vertical plane perpendicular thereto and to the film plane at said gate.

4. A photographic enlarger comprising a vertical support member, a projecting assembly including a base provided with a projection opening and a recess to one side thereof, and having an inclined portion forming one wall of said recess and inclined to a vertical plane through said projecting assembly and said support member, a film gate member having a portion aligned with said projection opening and another portion within said recess, a clamping member within said recess and for fastening said gate member in place, a lamp house upon said base and including a laterally extending projection adapted to cover said recess and having an angular portion, and a hinge member having one part fastened to the inclined portion of said base and the other part fastened to the angular portion on the projection from said lamp house and with the hinge axis extending through said vertical plane and through a second vertical plane perpendicular thereto and to the film plane at said gate.

ALVIN E. SCHUBERT.